United States Patent
Robertson et al.

(10) Patent No.: US 10,114,814 B1
(45) Date of Patent: Oct. 30, 2018

(54) SYSTEM AND METHOD FOR ACTIONIZING PATIENT COMMENTS

(71) Applicant: NarrativeDX, Inc., Austin, TX (US)

(72) Inventors: Kyle Robertson, Austin, TX (US); Taylor Turpen, Austin, TX (US)

(73) Assignee: NARRATIVEDX, INC., Austin, TX (US)

( * ) Notice: Subject to any disclaimer, the term of this patent is extended or adjusted under 35 U.S.C. 154(b) by 0 days.

(21) Appl. No.: 15/277,892

(22) Filed: Sep. 27, 2016

Related U.S. Application Data

(60) Provisional application No. 62/233,657, filed on Sep. 28, 2015.

(51) Int. Cl.
  *G06F 17/27* (2006.01)
  *G06F 17/30* (2006.01)
  *G06F 17/24* (2006.01)
  *G06Q 50/22* (2018.01)

(52) U.S. Cl.
  CPC ........ *G06F 17/2785* (2013.01); *G06F 17/241* (2013.01); *G06F 17/245* (2013.01); *G06F 17/2705* (2013.01); *G06F 17/278* (2013.01); *G06F 17/30778* (2013.01); *G06Q 50/22* (2013.01)

(58) Field of Classification Search
  CPC ........ G06F 17/30038; G06F 17/30716; G06Q 10/101; G06Q 50/01
  USPC ........................................ 704/1–10, 230–277
  See application file for complete search history.

(56) References Cited

U.S. PATENT DOCUMENTS

| | | | |
|---|---|---|---|
| 9,129,008 B1* | 9/2015 | Kuznetsov | G06F 17/30038 |
| 2012/0151347 A1* | 6/2012 | McClements, IV | G06Q 10/101 715/716 |
| 2014/0201749 A1* | 7/2014 | Bao | G06Q 50/01 718/102 |
| 2015/0106360 A1* | 4/2015 | Cao | G06F 17/30716 707/723 |

* cited by examiner

*Primary Examiner* — Huyen Vo
(74) *Attorney, Agent, or Firm* — Barnes & Thornburg LLP

(57) ABSTRACT

A system and method for processing and actionizing structured and unstructured patient experience data is disclosed herein. In some embodiments, a system may include a natural language processing (NLP) engine configured to transform a data set into a plurality of concepts within a plurality of distinct contexts, and a data mining engine configured to process the relationships of the concepts and to identify associations and correlations in the data set. In some embodiments, the method may include the steps of receiving a data set, scanning the data set with an NLP engine to identify a plurality of concepts within a plurality of distinct contexts, and identifying patterns in the relationships between the plurality of concepts.

19 Claims, 8 Drawing Sheets

TABLE ONE

| TEXT | DATE | UNIT | PERSON |
|---|---|---|---|
| My nurse was mean and she hit me | 01/01/2015 | 4E | None |
| I like the food. I do not like the beds | 01/02/2015 | 3E | None |

FIG. 4

TABLE TWO

| PHRASE ID | SENTIMENT | NAMED ENTITY | PRIMARY TAG | SECONDARY TAG | DRIVER | APPROVAL |
|---|---|---|---|---|---|---|
| 1 | Negative | None | Nurses | Courtesy and respect | None | True |
| 2 | Positive | None | Meals | Overall quality | None | True |
| 3 | Negative | None | Room | Comfort | Bed | True |

FIG. 5

TABLE THREE

| PHRASE ID | SENTIMENT | NAMED ENTITY | PRIMARY TAG | SECONDARY TAG | DRIVER |
|---|---|---|---|---|---|
| 1 | Negative | None | Nurses | Courtesy and respect | None |
| 2 | Positive | None | Meals | Overall quality | None |
| 3 | Negative | None | Room | Comfort | Bed |

FIG. 6

SYSTEM AND METHOD FOR ACTIONIZING PATIENT COMMENTS

CROSS REFERENCE TO RELATED APPLICATION

The Present Application claims priority to U.S. Provisional Patent Application No. 62/233,657, filed on Sep. 28, 2015, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates a system and method for processing and actionizing structured and unstructured patient experience data. The system and method described herein may be utilized for processing disparate patient experience data sources such as medical records, surveys, doctor review sites and social media.

Description of the Related Art

Natural language processing ("NLP") is a field of computer science, artificial intelligence, and linguistics concerned with the interactions between computers and human languages. It involves the processing of a natural language input. A natural language input is generally language used by a person (as opposed to a computer language or other artificial language), including all of the idioms, assumptions and implications of an utterance in a natural language input. Natural language processing implemented by a computer is typically an attempt to determine the meaning of a natural language input such that the natural language input can be "understood" and/or acted on by the computer. To interact with humans, natural-language computing systems may use a data store that is parsed and annotated.

Presently, in the healthcare industry, there is a need for systems and methods that are able to rapidly parse, combine, and interpret multiple structured and unstructured data sources. Healthcare information, such as information related to a patient's care experience and satisfaction, is fractured across many isolated data stores in varying formats. To compound the problem, even when data is available, there are no easily available means of processing this data with a high degree of accuracy or efficiency.

Moreover, in healthcare data management systems today, only about 20% of data is structured or machine-readable. Information that is not structured or machine-readable is ignored or unusable in conventional analytics systems. Online data sources, such as doctor review sites and social media, consist of largely unstructured data. Additionally, data collected from surveys or other public and private sources is often a mixture of both unstructured and structured data that varies between data stores. Due to lack of interoperability between these data stores and formats, these sources have not been analyzed in conjunction with one another.

Significantly, online data sources have risen in importance for healthcare providers, similar to most customer-focused industries. Data from online sources must be extracted, transformed, and loaded into a structured/compatible form. Extract, Transform, Load (ETL) jobs extract data from a source, transform the extracted data using one or more transformations to a format compatible with a target, and load the data into the target, for example a target database. Extraction refers to actually obtaining the data from individual data sources. Transformation indicates processing the data to put it into a more useful form or format. Loading refers to the process of loading the data into the tables of a relational database.

Attempts have been made to use customer-focused NLP systems from the hospitality and restaurant industries in the healthcare space, but these systems' lack of specificity for healthcare make them inaccurate and ineffective for actionizing patient feedback. Further, investments in such technologies do not yield the comprehensive, reliable or actionable information necessary to improve a healthcare organization's viability. Instead, the value-added by the data reviewed by these technologies is diminished as true data integration and interoperability is not achieved.

There have been few attempts to construct healthcare-specific NLP systems that may automatically collect and annotate key information related to the patient's care experience and satisfaction, such as the patient's sentiment regarding the experience, identification of key staff involved in the experience and key themes describing the care experience.

Performing these annotations with a high degree of accuracy has proven to be a difficult task due to the complex nature of language, the many ways that a care experience concept can be expressed, the inherent complexity of the subject matter, and the distributed and varied nature of the available data sources. As a result, NLP software tends to be large, expensive and complex, difficult to develop and maintain, and demands significant processing power, working memory, and time to run. Further, when attempting to process data from isolated sources in differing formats, annotation accuracy is difficult to achieve. This is especially true for unstructured data—annotations regarding sentiments, named entities, key themes and the like that may fall below a traditional threshold for statistical significance. Nevertheless, unstructured data may indicate real problems with care experiences that are of value to healthcare administrators. Despite it's value, it has traditionally been difficult to process and understand.

Furthermore, current methods of data extraction are slow and ineffective. These systems, however, which use only a fraction of the data available, have already been shown to reduce cost and improve outcomes. If systems and methods had the capability of using the knowledge incorporated within unstructured data in an efficient manner to improve patient experience, the benefits would be tremendous. By utilizing this knowledge, care could be improved and cost reduced through quality improvement, efficiency, comparative effectiveness, safety, and other healthcare analytics powered by this data.

Thus, there is a need in the field of processing patient experience data, and more specifically in the field of processing disparate data sources such as medical records, government surveys, doctor review sites and social media, for new and improved systems and methods for processing data. In particular, systems and methods are needed that are able to rapidly parse, combine, and interpret multiple structured and unstructured data sources. Described herein are devices, systems and methods that address the problems and meet the identified needs described above.

BRIEF SUMMARY OF THE INVENTION

The present invention is a system and method for processing and actionizing structured and unstructured patient experience data. In some embodiments, a system may include a natural language processing (NLP) engine configured to transform a data set into a plurality of concepts within a plurality of distinct contexts, and a data mining engine configured to process the relationships of the concepts and to identify associations and correlations in the data set. In some embodiments, the method may include the steps of receiving a data set, scanning the data set with an NLP engine to identify a plurality of concepts within a plurality of distinct contexts, and identifying patterns in the relationships between the plurality of concepts.

One aspect of the present invention is a system for processing and actionizing patient experience data. The system comprises a server comprising a natural language processing (NLP") engine, and a relational database. Communications are received at the server, and each of the communications comprises comment data. The comment data from each of the communications is stored at the relational database. The comment data from each of the communications is parsed for individual phrases to generate a plurality of phrases. One or more phrases are selected from the plurality of phrases based on a predetermined parameter. At the NLP engine one or more annotations are predicted for the one or more phrases based upon a score.

Another aspect of the present invention is a method according for processing and actionizing patient experience data. The method includes receiving at a server a plurality of communications. Each of the plurality of communications comprises comment data. The method also includes storing the comment data of each of the plurality of communication at a relational database. The method also includes parsing the comment data for individual phrases to generate a plurality of phrases. The method also includes selecting one or more phrases from the plurality of phrases based on a predetermined parameter. The method also includes predicting at a NLP engine one or more annotations for the one or more phrases based upon a score.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 4 is an illustration of a response table into which data that has undergone ETL is saved.

FIG. 5 is an illustration of a manual batching report table within which the preliminary analysis of pipelined data is represented.

FIG. 6 is an illustration of an annotation table which represents the final analysis of pipelined data.

DETAILED DESCRIPTION OF THE INVENTION

This invention relates to a system and method for processing and actionizing structured and unstructured patient experience data. The invention includes a hybrid NLP pipeline, which, combined with machine learning and crowdsourcing, recognizes the sentiments, themes, and named entities within the data. Pipelined data is then visualized on a user dashboard, outlining areas where the user has performed well and areas where the user can improve.

Definitions

In this specification, the terms "field," "data element," and "attribute" are used as synonyms, referring to individual elements of digital data.

Aggregates of data elements are referred to as "records" or "data structures."

Aggregates of records are referred to as "tables."

Aggregates of tables are referred to as "databases."

"Data mining" is an analytic technique to dynamically discover patterns in historical data records and to apply properties associated with these records to production data records that exhibit similar patterns.

"Unordered" means that the chronology of a record's attributes is not known.

"Unstructured" means that the attributes of a comment or phrase are not known.

Figure 1:
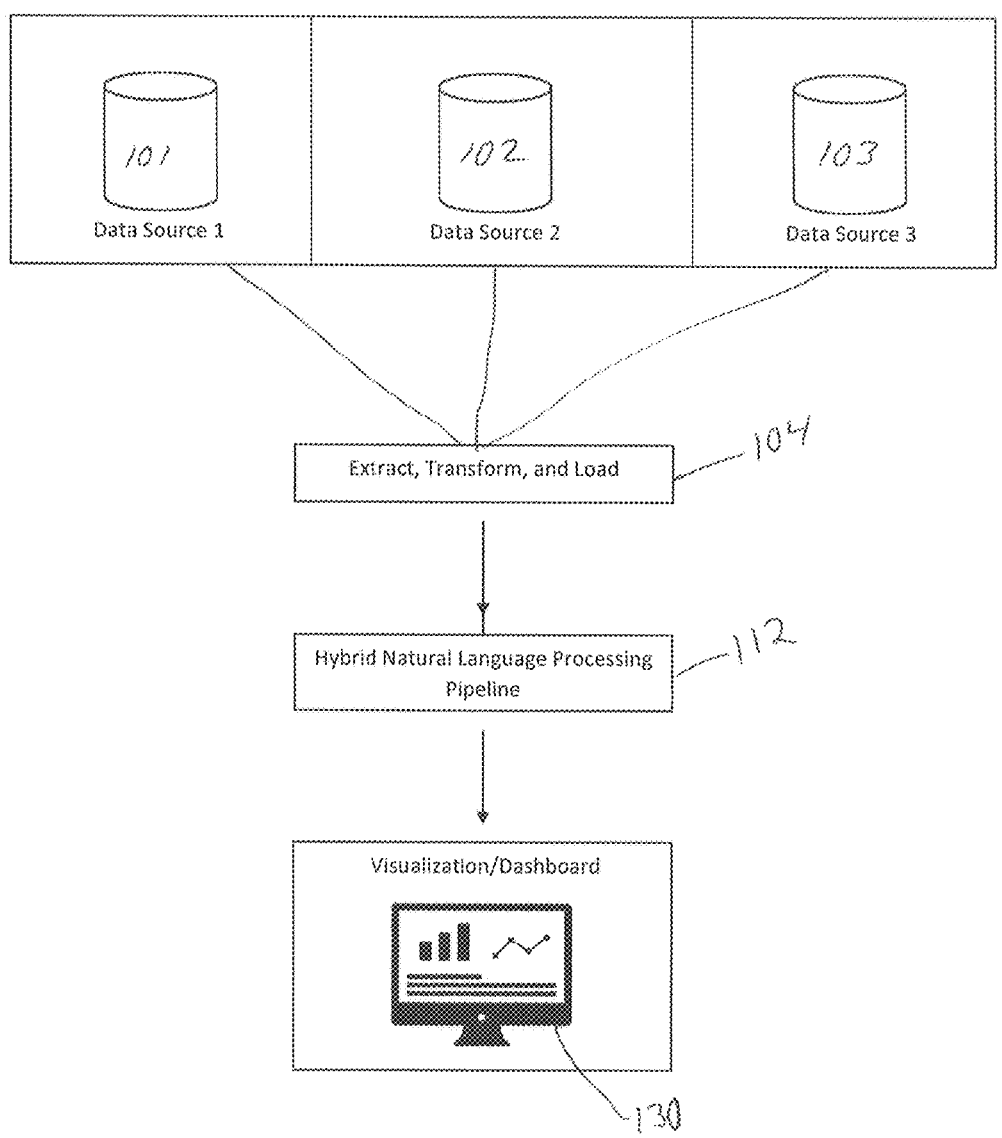
FIG. 1 is a diagrammatic flow chart of the overview of a system for processing and actionizing patient experience data.
Figure 2:
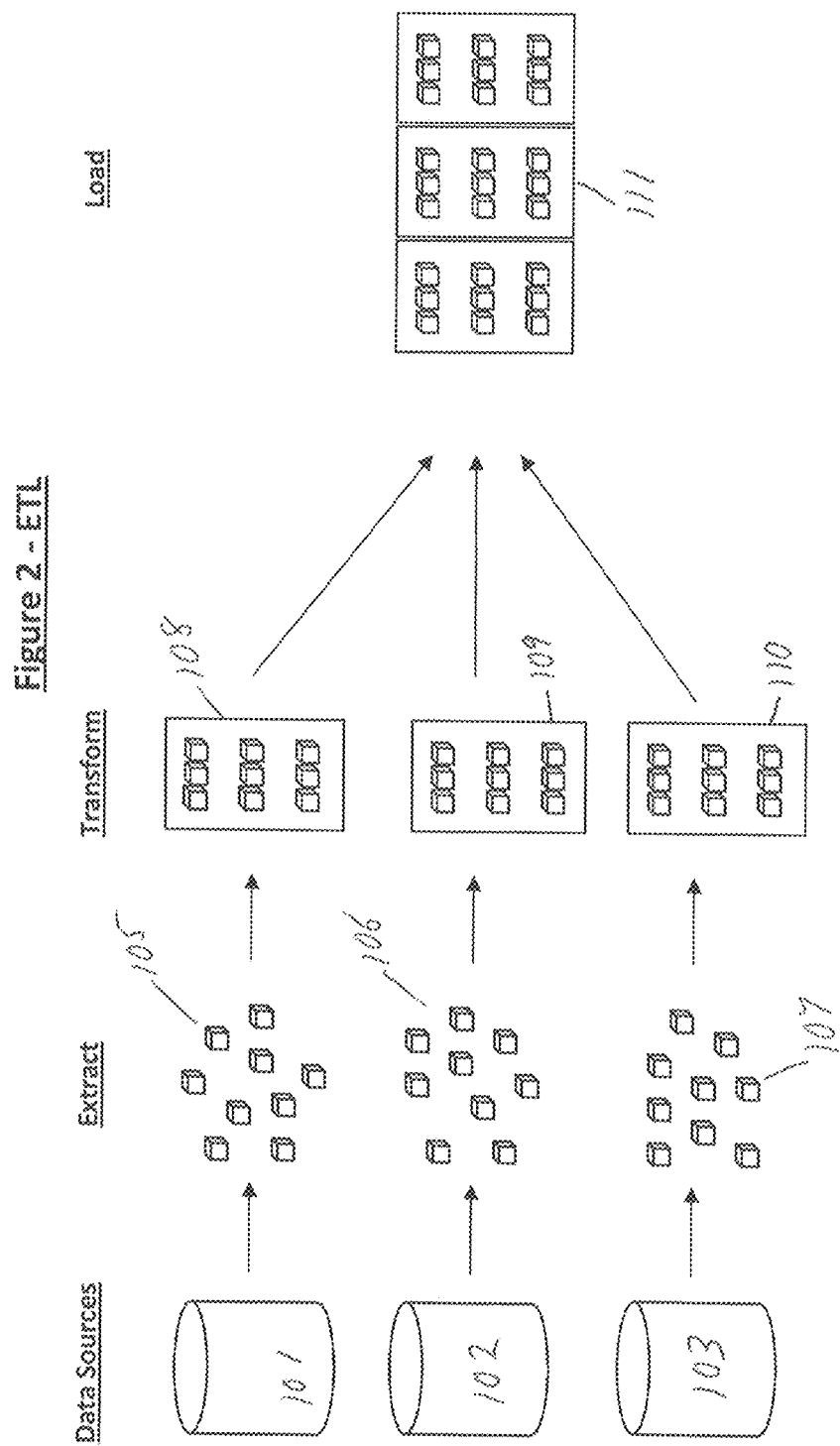
FIG. 2 is an illustration of how an ETL job of FIG. 1 is completed using sample input data and sample output data according to the embodiment of the present invention.
Figure 3:
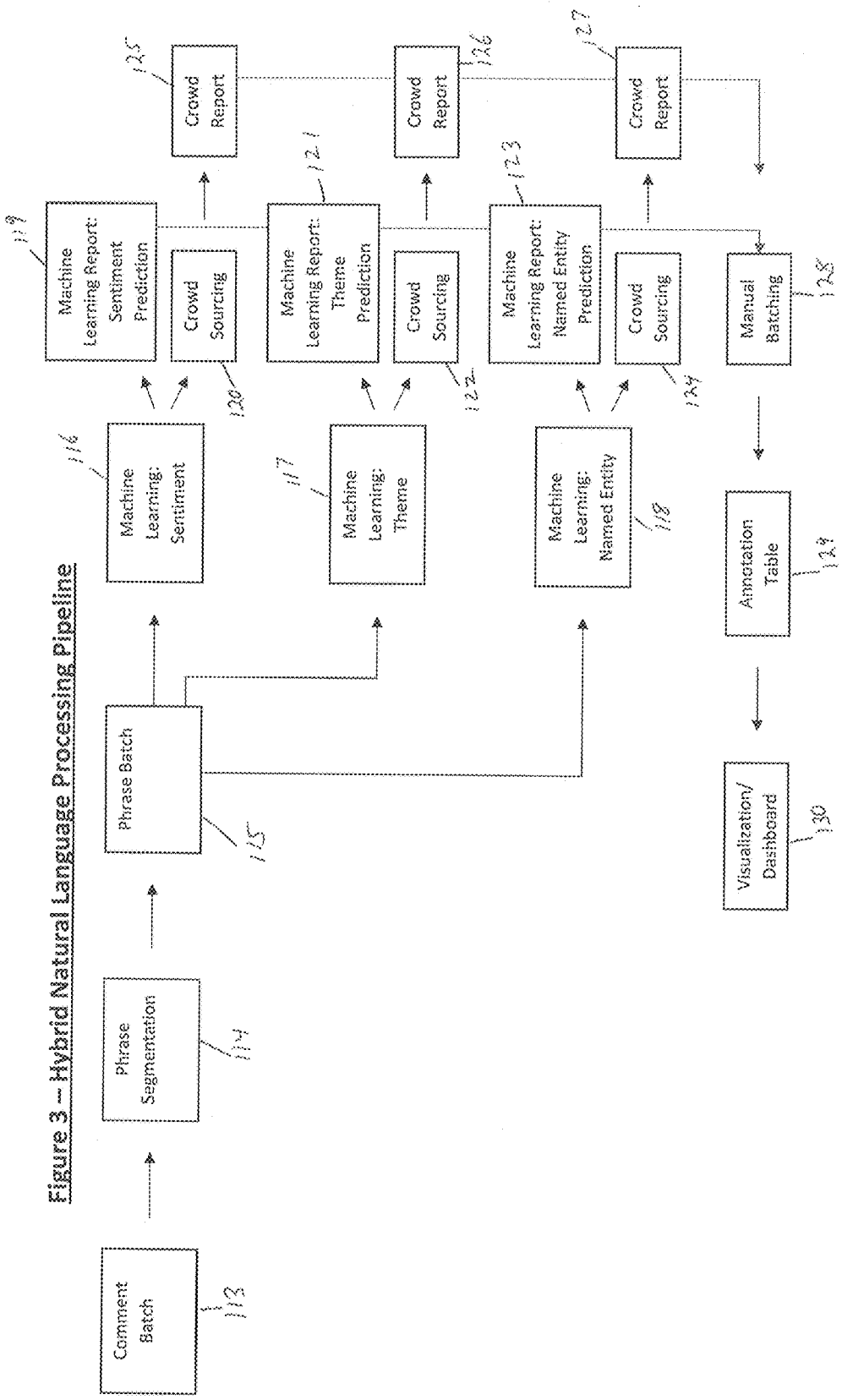
FIG. 3 is a flow chart of the hybrid NLP pipeline of FIG. 1.

FIGS. 1-3 show an embodiment of the present invention that is ultimately visualized on the dashboard 130. FIG. 1 provides an overview of the system. It illustrates how input, that is, comments, from various sources—hospital surveys, verbatims, and social media posts—are aggregated to then undergo ETL 104 to become structured and ordered information. This information next enters the hybrid NLP pipeline 112, where comments are segmented into phrases, the phrases studied to recognize sentiment, theme, and any named entity, which are finally approved and reflected in a batching report 128. The finalized information within the batching report is then visualized on a user's dashboard 130 or provided via an API, providing business intelligence for the user to act upon the inputted patient feedback.

FIG. 2 illustrates the ETL process of FIG. 1. Box 101 represents patient feedback data in HTML form, such as posts from social media. This data is unstructured and unordered. Box 102 represents data from hospital surveys. This data is structured, but unordered. Box 103 represents data from adaptive rounding surveys. This data is structured and ordered; thus requiring minimal extraction and transformation.

During extraction, 105 through 107, information from the data sources is converted from unstructured form to structured form. During transformation, 108 to 110, it is also converted from unordered to ordered form. Once input is extracted and transformed, loading 111 occurs wherein its attributes are recognized and loaded into the response table, shown in FIG. 4, thereby establishing the input's record. As shown in FIG. 4, each row of the table represents a different record. Each record consists at least of an input's text and date (i.e., its timestamp). Depending on the data source, however, the record may also contain an input's unit, the name of the healthcare professional about whom the input was written, and the input author's demographics.

Next, as shown in FIG. 3, from the response table of FIG. 4, a subset of comments, or a comment batch 113, enters the hybrid NLP pipeline. The hybrid NLP pipeline operates on a server. Comments are parsed for individual phrases based upon punctuation 114. A phrase includes either a full sentence or a part of a sentence that represents a complete thought. From this, a phrase batch is developed 115 for machine learning analysis. Each phrase is given a phrase identification number. Through machine learning, a phrase's sentiment, theme, and any named entity therein is predicted based upon a percentage of likelihood, 116 through 118. The machine learning for these areas, 116 through 118, is preferably done simultaneously.

Machine learning will produce a prediction for any one of the areas only if the percentage of likelihood satisfies a predetermined threshold percentage. This prediction along with the percentage of likelihood on which the prediction is based will be noted in the machine learning reports for sentiment 119, theme 121, and named entities 123. If the threshold percentage is not satisfied, however, machine learning will not produce a prediction for an area. Instead, the phrase will be sent to be crowdsourced or individually reviewed to determine what the ambiguous sentiment, theme, or named entity is, 120, 122, or 124. Then, upon the majority vote of crowd-sourcers or individual review, a prediction will be made and reflected in the respective crowdsourcing report, 125 through 127. Other criteria than majority, such as specific percentages, may be used instead of simple majority.

For example, in regards to sentiment, machine learning attempts to predict whether a phrase is positive or negative 116. However, if the threshold percentage is set at 90% and if machine learning can only predict that the likelihood that a phrase is positive is 84%, it will not produce a sentiment prediction 119. The phrase will instead be crowdsourced 120 and voted upon to establish its sentiment prediction, which will be reflected in the sentiment crowd report 125. The prediction results of the machine learning reports and the crowdsourcing reports for each phrase are next compiled and reviewed during the batching step 128 (manual or automatic). Preferably, for manual batching, there is a human review of the predictions in which any area's—sentiment's, theme's, or named entity's—machine learning or crowdsourcing prediction is marked as true or false, or, in other words, approved or rejected autonomously and with final authority at step 128. The purpose of the step is to ensure accuracy. Upon completion, as shown in Table Two of FIG. 5, each phrase is then listed by its identification number and the phrase's sentiment and any named entity therein is reflected. The phrase is also given a primary and possibly a secondary tag. A primary tag reflects what a phrase is mainly about. This usually corresponds with the subject of a phrase. A secondary tag is optional and reflects a phrase's general theme. A phrase can have multiple primary or secondary tags.

Once the results of the batching (manual or automatic) are finalized, they are inputted into the annotation table 129 (and as shown in Table Three of FIG. 6). At the annotation table 129, each phrase from the comment batch 113 is listed by phrase identification number and mirrors the records of the manual batching report of FIG. 5, except that there is no approval step. The information reflected in the annotation table of FIG. 6, is thus the finalized records of each phrase, which is then visualized on a user's dashboard 130 to provide the user with business intelligence and allow the user to actionize patient feedback, 101 through 103.

The NLP engine preferably predicts if a phrase is positive or negative. The NLP engine preferably tags each phrase based on a subject matter of the phrase.

The system further comprises a dashboard for providing business intelligence for the user to act upon the inputted patient feedback. This information can also be provided via an API.

The comment data of each of the plurality of communications is preferably extracted at server, wherein the extracted texts are transformed to a format compatible with a target, and wherein the transformed texts are loaded into a plurality of tables of the relational database.

The comment data from each of the plurality of communications is preferably parsed for individual phrases based upon punctuation or linguistic structure. A phrase's annotation preferably comprises one of a phrase's sentiment, theme, or any named entity therein. The plurality of communications is preferably collected from publicly available data and uploaded from a hospital entity. Phrases that receive a complete annotation (sentiment, primary tag, secondary tag with an optional driver), also generate an improvement action because the logic of the annotation is structured such that there is one improvement for each unique annotation. Each phrase of the plurality of phrases is preferably provided with an identification.

A system for processing and actionizing patient experience data comprises a server comprising a natural language processing (NLP") engine, and a relational database. The server preferably operates on AMAZON web services ("AWS"), and the engine is preferably written in PYTHON running on the server. The relation database is preferably Postgresql running on AWS. The communications received at the server are preferably scraped comments from Internet web sites such as YELP or ZOCDOC. Each of the communications comprises comment data such as survey comments from patient satisfaction surveys. The relational database preferably maps sources to their comments. The comment data from each of the communications is parsed for individual phrases to generate a plurality of phrases, preferably by linguistic structure. One or more phrases are selected from the plurality of phrases based on a predetermined parameter. At the NLP engine one or more annotations are predicted for the one or more phrases based upon a score, such as a sentiment and a theme assigned to each phrase with a score meeting a criteria, such as being greater than 0.5.

For example, a web-scraped comment from YELP from a patient that stated "My nurse was mean and she hit me", is received at the server. A survey comment that, "I like the food. I do not like the beds" is also received at the server. The comments are parsed into: My nurse was mean; she hit me; I like the food; and I do not like the beds. In this example, phrases are selected based on linguistic characteristics—the content having more than three words. So the following phrases are selected: My nurse was mean; I like the food; and I do not like the beds. Next, at the NLP engine one or more annotations are predicted for the one or more phrases based upon a score. Negative (0.7)+Attitude (0.6): Negative+Attitude: My nurse was mean. Positive (0.8)+

Food (0.4): Positive: I like the food. Negative (0.3)+Comfort (0.9): Comfort: I do not like the beds.

The hybrid natural language processing pipeline ("pipeline") is a natural language batch-processing system. The input for the pipeline is organized as "batches" (groups) of "documents." Alternatively, the pipeline processes one batch at a time. Pieces of each document are referred to as "phrases." A phrase can be any text within the document, including the entire document. The pipeline's primary function is to take batches of comments, split the comments into phrases and then assign an annotation to each phrase. An annotation is a complete set of categorical or numeric labels.

The hybrid natural language processing pipeline combines four components to generate high quality annotations: Rulebased, Machine, Crowd and Annotation. The rulebased component uses rules to generate individual labels for any annotation type with 100% certainty. The machine component generates labels for any phrase with variable certainty. The crowd component generates labels for any phrase using an open—call pool of workers. The annotation component uses logic to decide which labels from which components are ultimately assigned to each phrase.

A method for processing and actionizing patient experience data begins with collecting data from multiple sources: Internal sources, such as grievances, nurse rounding, call transcripts, etc; Public sources, such as Hospital Compare, CMS, Doctor Review Sites and Social Media; and Surveys, such as CAHPS, HCAHPS, CG-CAHPS and custom surveys. The next step is to Perform Annotations with Hybrid NLP Pipeline. The annotations preferably comprise: Themes, Named Entities, Sentiment, Category Discovery, and Category Annotation. The next step is to generate improvement suggestions for each category. The next step is to generate questions for improvement options for each category. The next step is to present questions via a survey. The next step is to collect qualitative and quantitative response data. The next step is to combine qualitative and quantitative data with new data collected by repeating the process from the first step.

Figure 7:
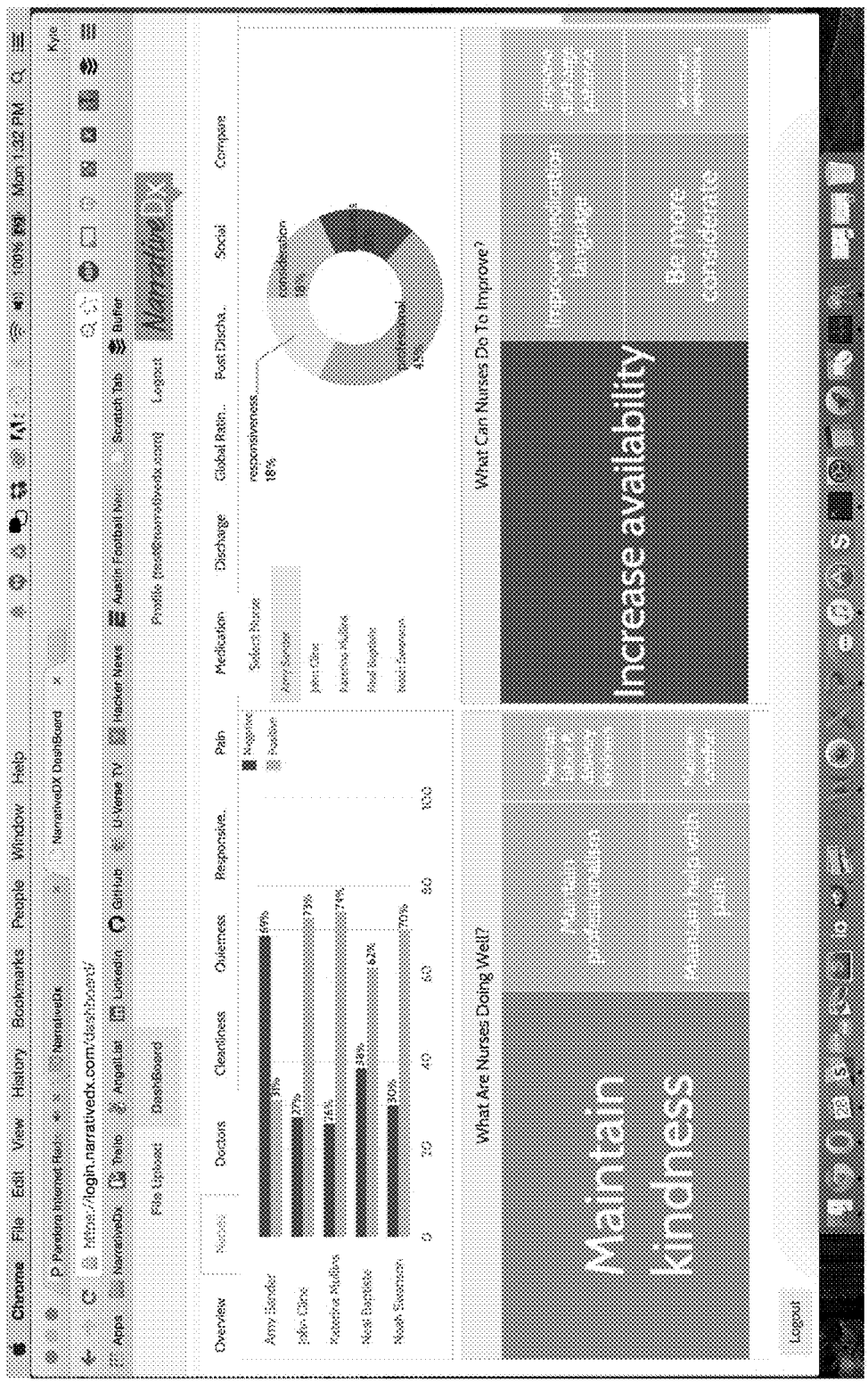
FIG. 7 is an illustration for a web page for a dashboard of a system for processing and actionizing patient experience data.

FIG. 7 is an illustration for a web page 700 for a dashboard of a system for processing and actionizing patient experience data.

Figure 8:
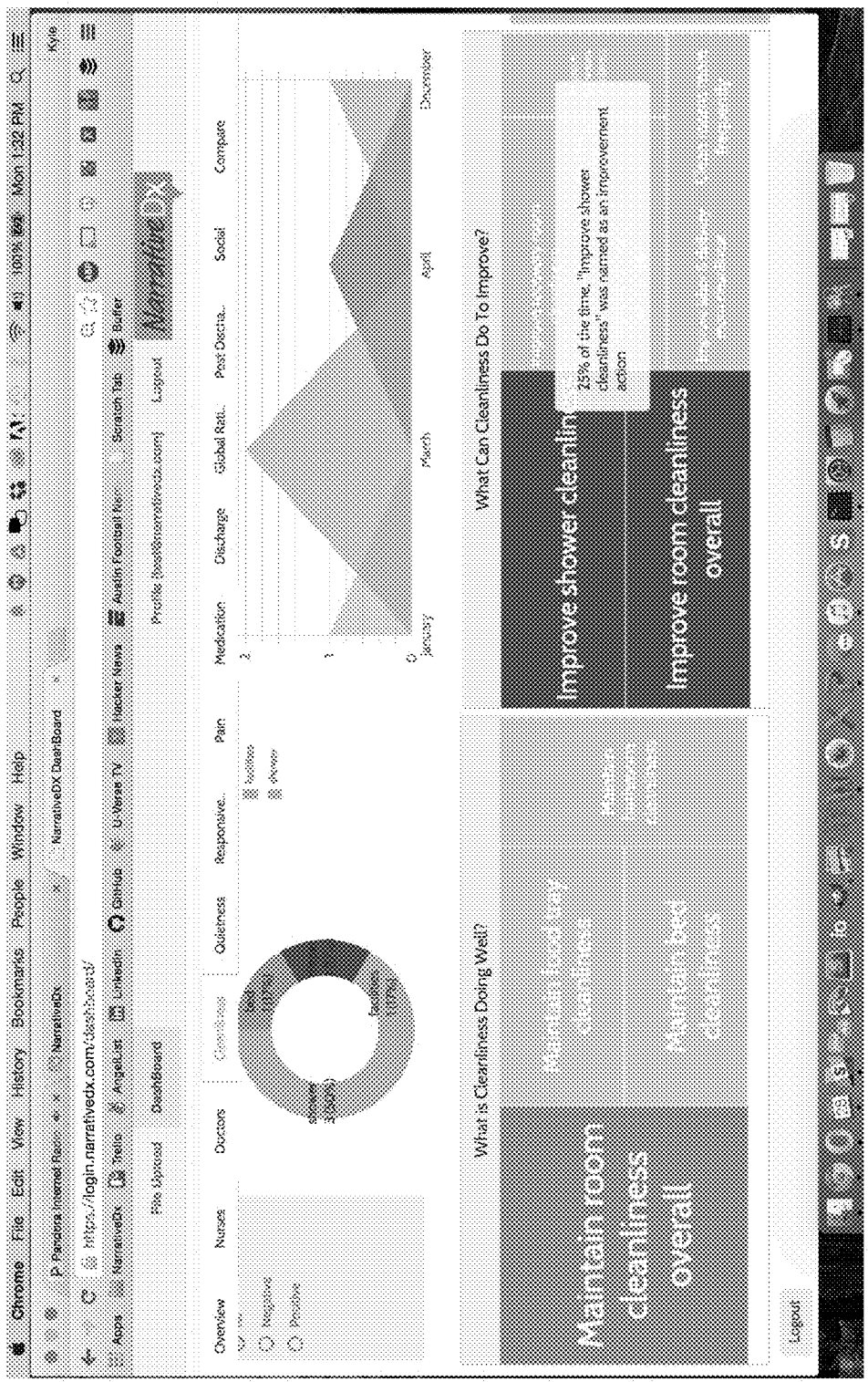
FIG. 8 is an illustration for a web page for a dashboard of a system for processing and actionizing patient experience data.

FIG. 8 is an illustration for a web page 800 for a dashboard of a system for processing and actionizing patient experience data.

Figure 9:
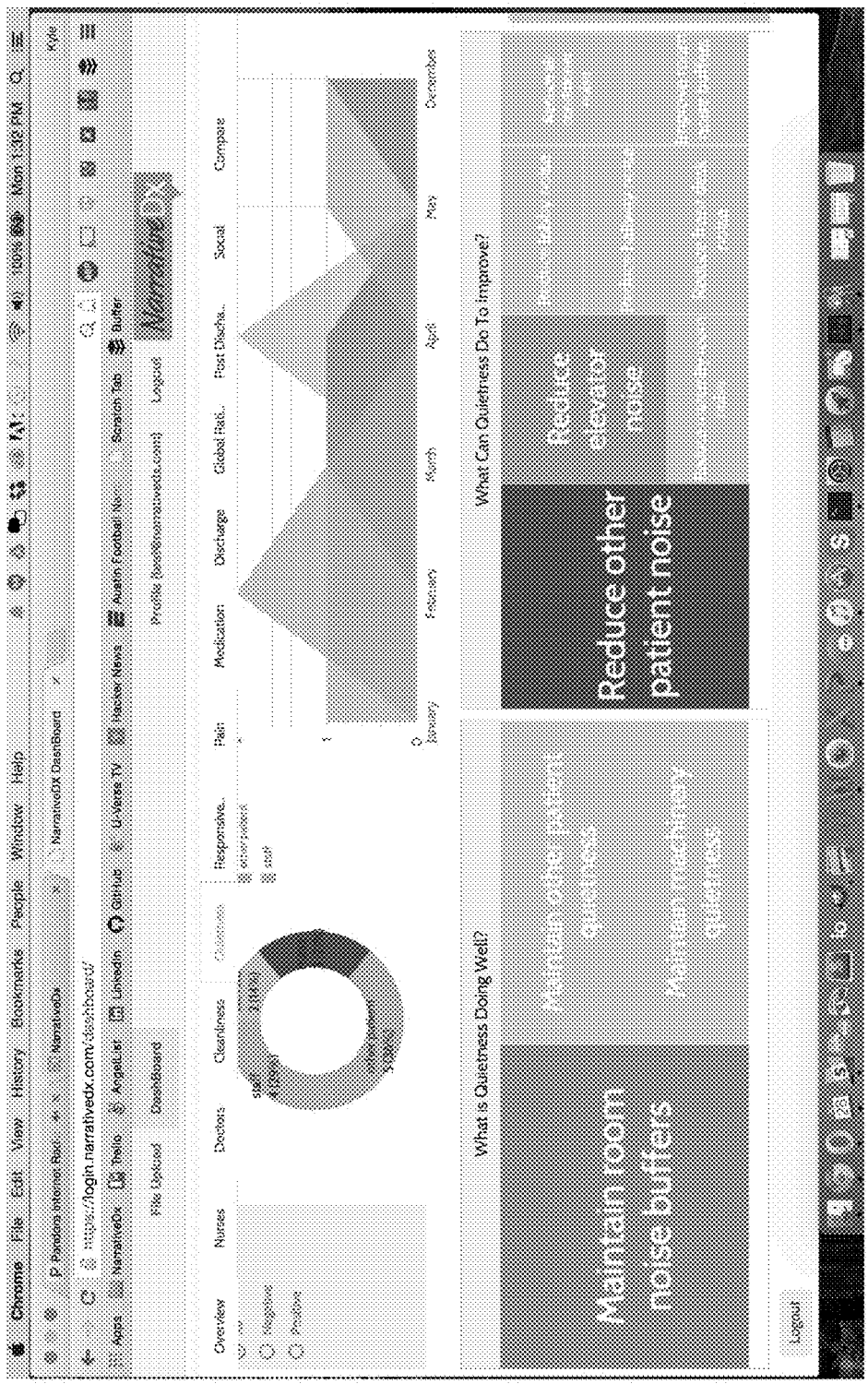
FIG. 9 is an illustration for a web page for a dashboard of a system for processing and actionizing patient experience data.

FIG. 9 is an illustration for a web page 900 for a dashboard of a system for processing and actionizing patient experience data.

The server includes a CPU component, a graphics component, PCI/PCI Express, RAM memory, non-removable storage, removable storage, Network Interface, including one or more connections to a fixed network, and a SQL database. Included in the memory, are the operating system, the SQL server, and computer programs. The data server also includes at least one computer program configured to receive data uploads and store the data uploads in the SQL database. The SQL server comprises of other components of SQL server that can be installed separately from the SQL database engine.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MS SQL, Access, My SQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at the server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A system for processing and actionizing patient experience data, the system comprising:
   a server comprising a natural language processing (NLP) engine; and
   a relational database;
   wherein a plurality of communications is received at the server, each of the plurality of communications comprises comment data collected from publicly available data of an Internet web site or from one or more surveys, wherein the comment data comprises structured or unstructured patient experience data;
   wherein the comment data from each of the plurality of communications is transformed to structured patient experience data and stored at the relational database in a response table that includes one or more records, wherein each record corresponds to the comment data from a communication, and wherein each record comprises the corresponding comment data and a timestamp;
   wherein the comment data from each of the plurality of communications is parsed for individual phrases to generate a plurality of phrases;
   wherein one or more phrases are selected from the plurality of phrases based on a predetermined parameter;
   wherein the NLP engine is to predict one or more annotations for the one or more phrases based upon a score, wherein to predict the one or more annotations for the one or more phrases based upon the score comprises to (i) predict one or more annotations for the one or more phrases based upon a machine learning score, wherein the one or more annotations comprise a sentiment, a theme, or any named entity of the one or more phrases, (ii) determine whether the machine learning score is less than a predetermined threshold score, and (iii) predict the one or more annotations for the one or more phrases based upon a reference score in response to a determination that the machine learning score is less than the predetermined threshold score;

wherein the one or more annotations are stored at the relational database in an annotation table that includes one or more records in response to prediction of the one or more annotations, wherein each record corresponds to an annotation, and wherein each record includes the sentiment, the named entity, a primary tag indicative of a subject matter, or a secondary tag indicative of the theme; and wherein the server is to generate a dashboard web page for a user that includes the one or more annotations in response to prediction of the one or more annotations.

2. The system according to claim 1 wherein the NLP engine predicts the sentiment of the phrase, wherein the sentiment comprises if the phrase is positive, negative or neutral.

3. The system according to claim 1 the NLP engine tags each phrase with a primary tag based on a subject matter of the phrase.

4. The system according to claim 1 further comprising an API for providing business intelligence for the user to act upon the inputted patient experience data.

5. The system according to claim 1 wherein the comment data of each of the plurality of communications is extracted at server, wherein the extracted comment data are transformed to a format compatible with a target, and wherein the transformed comment data are loaded into the response table of the relational database.

6. The system according to claim 1 wherein the comment data from each of the plurality of communications is parsed for individual phrases based upon punctuation or linguistic structure.

7. The system according to claim 1 wherein the plurality of communications is collected from publicly available data and uploaded from a hospital entity.

8. The system according to claim 1 wherein the server is configured to (i) determine whether a phrase is associated with a complete record in the annotations table, wherein the complete record comprises a sentiment, a primary tag, and a secondary tag, and (ii) generate an improvement action as a function of the phrase's annotation in response to a determination that the phrase is associated with a complete record.

9. The system of claim 1, wherein to predict the one or more annotations for the one or more phrases based upon a reference score comprises to (i) store the one or more annotations at the relational database in a batching table that includes one or more records, wherein each record corresponds to an annotation, and wherein each record includes the sentiment, the named entity, the primary tag, the secondary tag, and an approval; and (ii) receive the approval in response to storing the one or more annotations at the relational database in the batching table.

10. The system of claim 1, wherein the NLP engine is to predict the sentiment, the theme, and any named entity of the one or more phrases based upon the machine learning score in parallel.

11. A method according for processing and actionizing patient experience data, the method comprising:
receiving at a server a plurality of communications, each of the plurality of communications comprises comment data collected from publicly available data of an Internet web site or from one or more surveys, wherein the comment data comprises structured or unstructured patient experience data;
transforming the comment data of each of the plurality of communications to structured patient experience data;
storing the comment data of each of the plurality of communications at a relational database in a response table that includes one or more records, wherein each record corresponds to the comment data from a communication, and wherein each record comprises the corresponding comment data and a timestamp;
parsing the comment data for individual phrases to generate a plurality of phrases;
selecting one or more phrases from the plurality of phrases based on a predetermined parameter;
predicting at a NLP engine one or more annotations for the one or more phrases based upon a machine learning score wherein the one or more annotations comprise a sentiment, a theme, or any named entity of the one or more phrases;
determining whether the machine learning score is less than a predetermined threshold score;
predicting the one or more annotations for the one or more phrases based upon a reference score in response to determining that the machine learning score is less than the predetermined threshold score;
storing the one or more annotations at the relational database in an annotation table that includes one or more records in response to predicting the one or more annotations, wherein each record corresponds to an annotation, and wherein each record includes the sentiment, the named entity, a primary tag indicative of a subject matter, or a secondary tag indicative of the theme; and
generating at the server a dashboard web page for a user that includes the one or more annotations in response to predicting the one or more annotations.

12. The method according to claim 11 further comprising:
extracting the comment data of each of the plurality of communications at the server;
transforming the comment data to a format compatible with a target; and
loading the transformed comment data into the response table of the relational database.

13. The method according to claim 11 further comprising tagging at the NLP engine each phrase with a primary tag based on a subject matter of the phrase.

14. The method according to claim 11 further comprising an API for providing business intelligence for the user to act upon the inputted patient experience data.

15. The method according to claim 11 wherein the comment data of each of the plurality of communications is extracted at server, wherein the extracted comment data are transformed to a format compatible with a target, and wherein the transformed comment data are loaded into the response table of the relational database.

16. The method according to claim 11 wherein the comment data from each of the plurality of communications is parsed for individual phrases based upon punctuation or linguistic structure.

17. The method according to claim 11 further comprising:
determining whether a phrase is associated with a complete record in the annotations table, wherein the complete record comprises a sentiment, a primary tag, and a secondary tag; and
generating an improvement action as a function of the phrase's annotation in response to determining that the phrase is associated with a complete record, and wherein if a named entity is detected in the phrase the improvement action is specific for the named entity.

18. The method according to claim 11 wherein predicting the sentiment of the phrase comprises predicting if the phrase is positive, negative or neutral.

19. The method of claim 11, wherein predicting the one or more annotations for the one or more phrases based upon the reference score comprises predicting the one or more annotations based upon a manual review score.

* * * * *